2,502,369

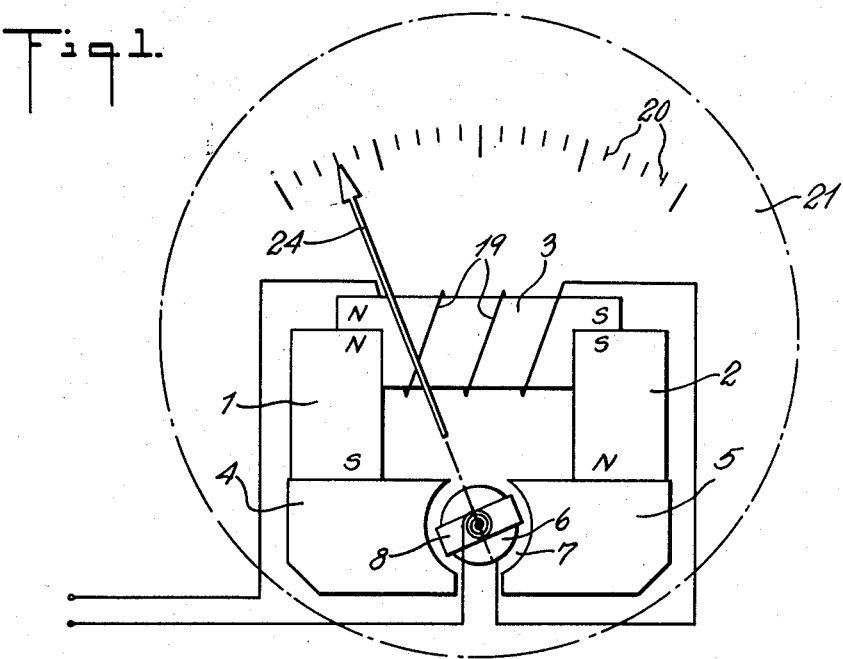
Fig. 1.
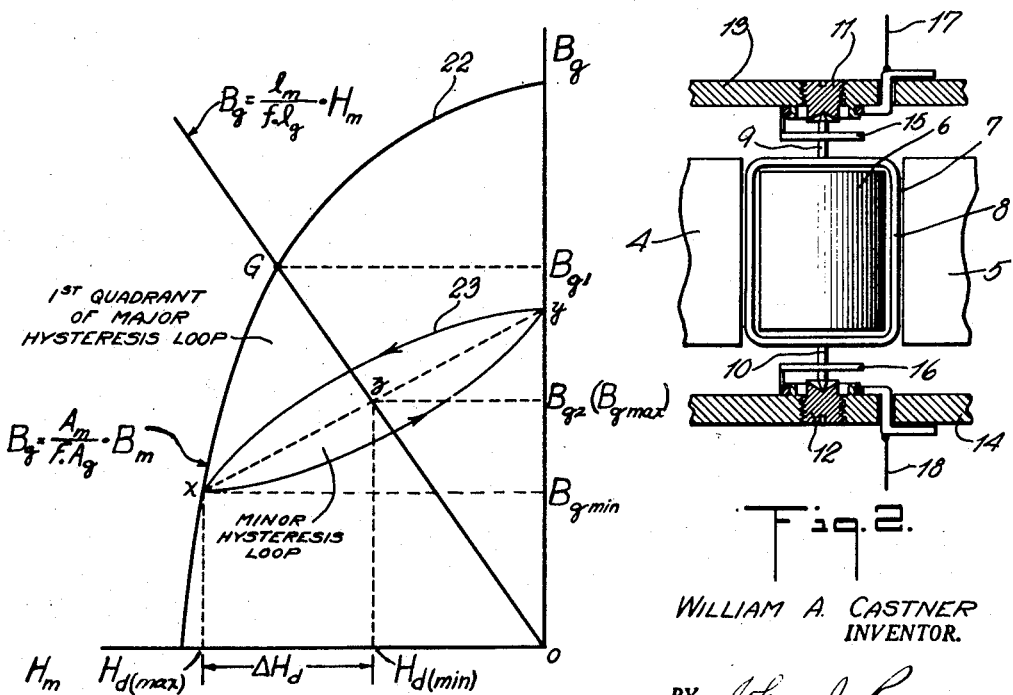
Fig. 2.
Fig. 3.
WILLIAM A. CASTNER
INVENTOR.
BY John J. Rogan
ATTORNEY Patented Mar. 28, 1950

UNITED STATES PATENT OFFICE 2,502,369

PERMANENT MAGNET METER WITH ELECTRODYNAMIC FIELD CONTROL

William A. Castner, Washington, N. J., assignor to Measurements Corporation, Boonton, N. J., a corporation of New Jersey Application October 9, 1945, Serial No. 621,339

7 Claims. (Cl. 171—95)

This invention relates to electrical indicating instruments and more particularly to such instruments of the permanent magnet and moving coil type.

A principal object of the invention is to provide a novel organization of magnetic circuit elements whereby a more precise control is provided over the scale characteristics of electrical indicating instruments of the moving coil-permanent magnet type, and without sacrificing the desirable features of such instruments and without changing their fundamental design.

A feature of the invention relates to an electric indicator of the moving coil type, wherein the coil is provided with a permanent magnet field which has its demagnetization controlled by the current or other electrical function to be measured.

Another feature relates to an electric measuring instrument of the moving coil type, wherein the magnetic field producing means which coacts with the coil, is comprised of a plurality of sections which are serially related in a magnetic sense. One of these sections is a permanent magnet section, and another is an electromagnet whose magnetic condition is controlled by the electrical function to be measured.

A further feature relates to an electric measuring instrument of the moving coil type having a magnetic circuit for coaction with the coil, the magnetic circuit comprising a pair of bar magnets of the permanent magnet type, and an intervening yoke section in the form of an electromagnet whose energization is adjusted in accordance with the desired scale marking distribution.

Another feature relates to an electrical measuring instrument of the permanent magnet and moving coil type, wherein the permanent magnet is provided with a demagnetizing means, the magnetic parameters of which in relation to the permanent magnet are so chosen that the demagnetization is confined to a minor hysteresis loop of the permanent magnet material.

A further feature relates to the method of controlling the scale marking distribution of an electrical indicating instrument of the permanent magnet type by subjecting the permanent magnet to a demagnetizing force which is a function of the electrical quantity being measured, the magnetic parameters being predetermined in accordance with the slope of a selected minor hysteresis loop of the permanent magnet material.

A further feature relates to the novel organization, arrangement and relative dimensions and location of parts which cooperate to produce an improved electrical indicating instrument of the moving coil and permanent magnet type.

In the drawing which shows one preferred embodiment,

Fig. 1 shows an electrical measuring instrument embodying the inventive concept.

Fig. 2 is an enlarged view of part of Fig. 1.

Fig. 3 is a series of curves explanatory of the invention.

In the art of electric measuring instruments, especially those of the moving coil type and permanent magnet type, it is very important to be able to control the spacing or distribution of the scale markings at various sections of the scale. The usual method of controlling the spacing of the scale markings is to make the radial distribution of the magnetic flux in the air gap nonuniform, either by making the pole pieces nonuniform, or by making the core non-uniform. In any event, the radial length of the air gap is non-uniform so that the total or integrated effective flux lines acting on the moving coil are less than they would be in a similar design with uniform air gap. This results in a less desirable torque-to-weight ratio of the instrument as a whole. Another disadvantage of the usual method of controlling the scale spacings by a non-uniform air gap is that at certain small angular segments of the gap, the flux distribution is such that the scale calibration is critical at the regions corresponding thereto. This may require the drawing of the corresponding scale marks by hand and their location is rather critical.

In some known constructions, only certain sections of the pole pieces and core adjacent to the regions of high flux density have their metallic composition at or near magnetic saturation. Since this saturated condition does not exist throughout the periphery of the pole pieces and core, any slight change in the magnetic permeability of the magnetic circuit as a whole or in any portion thereof, changes the flux density in the corresponding angular segment in the air gap, and likewise requires a corresponding change in the scale calibration. Furthermore, any dimensional changes caused by variations of ambient temperature or unavoidable physical shock, may shift the radial rate of flux distribution, causing a change in the scale calibration from its initial condition.

Accordingly, the present invention has for one of its principal objects a combination and organization of elements constituting the magnetic circuit of a moving coil instrument, whereby the air gap can be of uniform width while the flux density in the gap can be varied in accordance with the extent of movement of the moving coil while maintaining uniform radial flux distribution around the gap.

In achieving this object, the invention contemplates a special magnetic circuit or organization comprising a plurality of sections which are serially related so far as the magnetic flux is concerned. These sections comprise the usual moving coil core, the intervening air gap, a permanent magnet section, and an electrically controlled demagnetizing section for the permanent magnet. Preferably, the demagnetizing section is in the form of an electromagnet which is energized by the currents which also pass through the moving coil, and the dimensions of the various sections and their materials are chosen in accordance with the rate of change of the demagnetization desired in the permanent magnet section.

Referring to Fig. 1, there is shown in diagrammatic plan view a moving coil electric measuring instrument embodying the inventive concept. The instrument comprises a pair of permanent bar magnets 1 and 2, which are polarized as indicated. The upper ends of these permanent magnets are joined by a yoke 3 preferably of soft or very low remanence iron such as customarily used in electromagnets. It will be understood that the member 3 is rigidly fastened to magnets 1 and 2 by any suitable means (not shown). Likewise, fastened to the lower ends of magnets 1 and 2 are suitable pole pieces 4, 5, of soft or very low remanence iron such as is customarily used in moving coil instruments. The members 4 and 5 have their opposed pole faces hollowed out to form with the cylindrical soft iron core 6, an annular cylindrical air gap 7, within which the conventional moving coil 8 rotates.

In accordance with the invention, the air gap 7 is of a uniform radial thickness over the entire effective range of movement of coil 8. In the well-known manner, coil 8 is supported by upper and lower pivots 9, 10, and jewelled bearings 11 and 12 adjustably mounted in supports 13 and 14, which are electrically insulated from each other. Likewise, the usual restoring torque springs 15 and 16 with well-known adjustment members 17, are provided. In the usual manner, current is led into and out of the moving coil through the springs 15, 16, which are connected to the conductors 17 and 18 leading to the source to be measured.

In accordance with the present invention, the member 3 is provided with a magnetizing winding 19 of a predetermined number of turns so as to polarize member 3 as indicated, when a current passes through said winding 19. Also in accordance with the invention, the winding 19 is connected in series with the moving coil 8 so that the magnetization of member 3 is a function of the electrical quantity being measured. With this arrangement of parts, the energization of member 3 results in a demagnetization of the permanent magnets 1 and 2, with a corresponding reduction of the flux density in the air gap 7, but this variation of flux density is effected without changing the uniformity of the radial flux distribution around the gap.

I have found that the dimensions of the various sections of the magnetic circuit can be predetermined so as to provide any desired distribution of the scale markings 20, on the calibrated scale 21. In other words, the flux density $B_g$ in the air gap 7 is in accordance with the equation $$B_g = \frac{l_m}{f \cdot l_g} H_m$$

wherein $l_m$ is the length of the magnetic circuit, $l_g$ is the radial length of the air gap, and $f$ is a suitable design constant. As shown in Fig. 3, $B_g$ is a linear function of the total magnetizing force acting in the magnetic circuit.

Referring to Fig. 3, the curve 22 is part of the major hysteresis loop, in the second quadrant, of the material of the permanent magnets 1 and 2. The curve 23 represents one of the minor hysteresis loops. For a detailed description of the phenomena of minor hysteresis loops and their explanation, reference may be had to "Electrical Engineers' Handbook—Electric Communication and Electronics," by Pender-McIlwain, published by John Wiley & Sons, Inc., third edition, pages 2–53 and 2–54; and also to "Radio Engineers' Handbook" by Terman, published by McGraw-Hill Book Company, Inc., pages 90 and 91. In accordance with one phase of the invention, the dimensions of the magnetic circuit are so chosen that the resultant demagnetizing effect of member 3 on the permanent magnets causes the flux density in gap 7 to vary between $B_{g1}$ and $B_{g2}$, and the rate of change of this flux density is determined by the slope of the axis $xy$ of the minor hysteresis loop 23. This range and rate of change in flux density therefore corresponds to a change in demagnetizing force $\Delta H_d$. In accordance with the invention, the slope of the axis $xy$ is chosen in accordance with the desired scale distribution of the scale markings 20.

In designing the constants of the magnetic circuit, it can be assumed for all practical purposes, that the loop 23 is a closed loop. Strictly speaking however, this is not exactly so, for in its returns from $y$ to $x$, the upper boundary of the minor loop crosses the lower boundary and intersects the major hysteresis loop 22 at a point slightly lower than $x$. However, this departure from $x$ becomes unmeasurable after 2 or 3 cycles. The second assumption that can be made for all practical purposes, in using the invention, is that the minor hysteresis loop is substantially a straight line rather than a loop. The error that may be introduced by this assumption is negligible as the loop is very narrow when the magnetic materials employed are of very low coercive force.

As will be seen from Fig. 3, the curve 22 which relates the magnetizing force $H_m$ with respect to flux density $B_g$ in the air gap, is given by the equation $$B_g = \frac{A_m}{F \cdot A_g} B_m$$

wherein $A_m$ is the cross sectional area of the magnet; $A_g$ is the area of the gap; $B_m$ is the flux density in the magnet; and $F$ is a design constant. In other words, the flux density in the gap equals the flux density in the magnet multiplied by the factor $$\frac{A_m}{F \cdot A_g}$$

The curve showing the relation between magnetizing force $H_m$ and the flux density $B_g$ in the air gap is a substantially straight line defined by the equation $$B_g = \frac{l_m}{f \cdot l_g} \cdot H_m$$

as indicated in Fig. 3, wherein $l_m$ is the length of the magnetic circuit; $l_g$ is the length of the air gap; $f$ is another design constant. The intersection G of these two curves is the solution of the two simultaneous equations. This gives the flux density in the air gap having a length $l_g$ and an area $A_g$ where the magnet has a length $l_m$ and a cross-sectional area $A_m$. If the permanent magnet is subjected to a separate demagnetizing force $H_d$, the point G will be forced down to the point X. When this demagnetizing force is removed the operating point of the magnet goes up the minor hysteresis loop XY until it intersects the straight line function of $$B_g = \frac{l_m}{f \cdot g} \cdot H_m$$

at point Z. The flux density in the air gaps is now $B_g$ max. As the demagnetizing force $\Delta H_d$ varies between H min. to H max. the flux density of the air gap varies from B max. to B min., the rate of variation is the slope of the minor hysteresis loop between X and Z.

The relation of current through the moving coil to deflection of a symmetrical pole piece moving coil D. C. permanent magnet type instrument is linear, i. e. the deflection is directly proportional to the current through the moving coil $I_m$. This is so as the flux $\phi_G$ in the air gap is constant.

$$D \propto \phi_G I_m \quad (1)$$

In this invention the flux ($\phi_G$) in the air gap is not constant and is a function of the current through the moving coil $I_m$, and the $\phi_m$ of the permanent magnet. $\phi_D$ is equivalent to the demagnetizing force from the electromagnet. (K) is a constant proportional to the slope of the secondary demagnetizing curve of the permanent magnet.

$$\phi_G = (\phi_m - \phi_D) K \quad (2)$$
$$\phi_D \cong N_D I_m \quad (3)$$

wherein $N_D$ is the number of turns in the coil around the permanent magnet and $I_m$ is the current flowing through this coil.

The relation of deflection (D) to current in a symmetrical pole piece instrument is linear and in this invention the relation of demagnetizing force $\phi_D$ to the current in the electromagnet, which is the same as the current in the moving coil in the case under discussion is also linear as indicated above. Combining Equations 1, 2 and 3, we have, $$D \cong K(\phi_m - N_D I_m) I_m$$
$$D \cong K(\phi I_m - N_D I_m^2) \quad (4)$$

From the foregoing, it will be seen that the distribution of the scale markings 20, and also the rate of change of deflection of the moving coil with relation to the increment of the current flowing therethrough are a function of the demagnetization curve of the permanent magnets 1 and 2. It will be understood of course, that while this provides a novel factor in determining the scale distributions, other well-known factors may be controlled, including the torque of the springs 15, 16; the number of turns of wire on the coil 8; the number of turns of wire on member 3; and the initial air gap flux from the magnets 1 and 2.

It will be seen from the foregoing that the time rate of change of deflection of the pointer 24 is a function of the slope of the minor hysteresis loop 23 of the material of the permanent magnets 1 and 2. This time rate of change principle can be applied to electric current responsive devices generally, for example, time delay relays, and circuit breakers. In other words, the pointer 24 will then represent a relay armature or the circuit breaker arm of a circuit breaker switch, which is held in a normal portion by means of the springs 15 and 16. When a predetermined current flows through the coil 8, the relay armature of the circuit breaker arm is moved to another position. The time rate of change of deflection of this armature or arm can be controlled by a predetermined design of the permanent magnets 1 and 2 as above described so that this rate conforms with the slope of the desired minor hysteresis loop of the material of permanent magnets 1 and 2.

Following is a list of the more common magnetic materials that may be used, with their corresponding secondary demagnetization curve slopes given in terms of flux density and coercive force.

| Material | Value |
|---|---|
| 3% chromium steel | 42.0 |
| 6% tungsten steel | 45.6 |
| 15% cobalt, 10% chromium steel | 12.3 |
| 36% cobalt | 13.6 |
| Kato's oxide magnet | 1.072 |
| 42% cobalt steel | 11.8 |
| Nipermage (32% Ni—12% Al—Ti) | 3.59 |
| Alnic (Alnico III, 25% Ni—12% Al) | 4.29 |
| Alnico IV (28% Ni—12% Al—5% Co) | 4.01 |
| Alnico I (20% Ni—12% Al—5.0% Co) | 3.87 |
| New KS magnet steel 20% Co—18% Ni—7% Ti—3.7% Al | 4.01 |
| Alnico V | 1.435 |

While one particular embodiment has been disclosed herein, it will be understood that various changes and modifications may be made without departing from the spirit and scope of the invention.

What is claimed is:

1. In an electric measuring instrument, means providing a magnetic circuit which includes as part thereof a permanent magnet, said circuit having a magnetic gap therein, a deflectable current-carrying conductor mounted for movement in said gap, and means to control the relation between the incremental deflection of said conductor with respect to the rate of change of current flowing therethrough, the last-mentioned means including an electromagnet having a core of low magnetic remanence constituting part of said magnetic circuit, a demagnetizing winding on said core, and means to energize said demagnetizing winding by the series current flowing through said conductor and said winding, to demagnetize said permanent magnet between predetermined limits correlated with the slope of a predetermined minor hysteresis loop of the material of said permanent magnet.

2. An instrument of the moving coil type for measuring variable currents, comprising a moving coil to which currents to be measured are applied, a magnetic circuit for said moving coil constituted of at least one permanent magnet in series magnetic relation with an electromagnet having a core of low remanence, said electromagnet having a demagnetizing winding for said circuit which winding is connected in series with said moving coil and is energized by the series current flowing through said moving coil.

3. An electric indicating and measuring instrument having a moving coil, means to impress on said coil variable currents to be measured, means defining an air gap in which said coil is movable, means to set up across said air gap a substantially uniform magnetic field and including a permanent magnet in series magnetic relation with another section of low magnetic remanence, means for demagnetizing said permanent magnet and including a demagnetizing winding for said section of low remanence, and circuit connections betwee said moving coil and said demagnetizing winding for energizing said demagnetizing winding by the current flowing through said moving coil to subject said permanent magnet to a demagnetizing rate correlated with the slope of a minor hysteresis loop of the material of said permanent magnet.

4. An electric measuring and indicating instrument according to claim 3, in which said permanent magnet is composed of high remanence material having a minor hysteresis loop with a predetermined slope, and said demagnetization is confined between the limits of said loop.

5. An electric measuring instrument comprising a movable armature for carrying current whose amplitude is to be measured, means defining a magnetic circuit for cooperation with said armature and including a permanent magnet of a material having a minor hysteresis loop with a predetermined slope, a demagnetizing coil for said permanent magnet, means to apply to said demagnetizing coil a demagnetizing current which is the same as the current carried by said armature, the ampere turns of said demagnetizing winding being correlated with said slope so that the incremental change of movement of said armature with relation to the incremental change of current carried by the armature is correlated with the slope of said minor hysteresis loop.

6. An electric current measuring instrument having a moving coil, means to impress on said coil variable currents to be measured, means defining an air gap of uniform radial width in which said moving coil is rotatable, means to set up across said gap a substantially uniform magnetic field and including a permanent magnet in magnetic series relation with another section of low magnetic remanence, means for demagnetizing said permanent magnet and including a demagnetizing winding for said low remanence section, circuit connections connecting said moving coil in series with said demagnetizing winding to subject said permanent magnet to demagnetization rate correlated with the slope of a minor hysteresis loop of the material of said permanent magnet.

7. An electric measuring instrument having a pair of input terminals to which variable voltages to be measured are applied, a moving coil which is energized by said variable voltages, means defining a magnetic circuit with an air gap wherein said coil is rotatable, said means including in series magnetic relation a permanent magnet and an electromagnet with a core of low magnetic remanence, a winding on said core for demagnetizing said permanent magnet at a rate correlated with the slope of a minor hysteresis loop of the material of said permanent magnet, and means connecting said demagnetizing winding in series with said coil to provide a linear relation between angular deflection of said coil and variation in an amplitude of said voltage to be measured.

WILLIAM A. CASTNER.

REFERENCES CITED

The following references are of record in the file of this patent:

UNITED STATES PATENTS

| Number | Name | Date |
|---|---|---|
| 392,386 | Weston | Nov. 6, 1888 |
| 1,695,424 | Harrison | Dec. 18, 1928 |
| 1,858,267 | Eames | May 17, 1932 |
| 1,985,082 | Faus | Dec. 18, 1934 |
| 2,077,186 | Rich | Aug. 13, 1937 |

FOREIGN PATENTS

| Number | Country | Date |
|---|---|---|
| 224,587 | Germany | July 25, 1910 |